Figure 1:
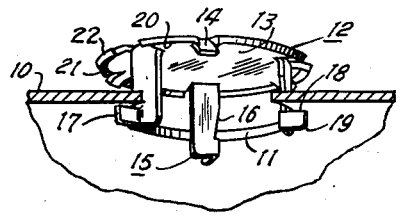

March 5, 1963  H. C. GLITSCH ET AL  3,080,155
FLOW CONTROL MEANS

Filed Jan. 18, 1960  2 Sheets-Sheet 1

INVENTORS
Hans C. Glitsch
Francis W. Winn
BY *Shley & Shley*
ATTORNEYS

INVENTORS
Hans C. Glitsch
Francis W. Winn

BY *Shley & Shley*

ATTORNEYS 3,080,155
Patented Mar. 5, 1963

1

3,080,155
FLOW CONTROL MEANS
Hans C. Glitsch and Francis W. Winn, Dallas, Tex., assignors to Fritz W. Glitsch & Sons, Inc., Dallas, Tex., a corporation of Delaware
Filed Jan. 18, 1960, Ser. No. 2,935
4 Claims. (Cl. 261—114)

This invention relates to new and useful improvements in flow control means for the fluid flow orifices of fluid contact trays.

Fluid contact trays, which are superimposed in towers or other vessels, are utilized in petroleum and chemical processes, such as fractionation, absorption and distillation, wherein gases or vapors and liquids or liquids and liquids are contacted for separation, recovery, refinement or purification. A predetermined level of liquid is maintained on each tray which has a multiplicity of openings or orifices to permit gas, vapor, or other fluid therebelow to flow therethrough into contact with the liquid. It is more or less conventional to mount bubble caps or chimneys or risers above the tray openings for directing the fluid laterally through the liquid on the tray. Due to the inherent limitations of bubble caps, closures of the valve type have been employed for controlling the flow of the fluid through the tray openings in attempts to provide more uniform distribution of said flow and intimate contact and thorough mixing of said fluid with the liquid. These closures endeavored to regulate the areas of the flow passages in accordance with differential ranges of pressures across the tray, that is, the differences between the pressures above and below said tray, and said closures have been of various designs for increasing the operating efficiency throughout wider ranges of capacities. A valve type tray, operating through a range of its capacity, is subject to frequent opening and closing of its closures whereby said closures tend to trap and/or pump liquid through their vapor orifices to the tray below. This action is magnified by fluctuating loads or causes pulsations at various percentages of maximum tray capacity with consequent loss of operating efficiency.

It is generally accepted by the majority of chemical process engineers that the velocity head, i.e. the kinetic energy of the fluid entering the liquid, through or across a tray has a direct bearing on the efficient performance or efficiency of the tray. Also, it is generally recognized that the pressure drop or differential across a tray is critical under many operating conditions. Therefore, it is desirable, and often essential, to attain the optimum vapor velocity at the point of contact or mixing of the fluid with the liquid on a tray without creating an excessive pressure drop across the tray. Since the product demanded from a fluid contact tower usually varies with the season and the supply in storage, economy requires the tower and its trays to have a wide range of capacity with respect to vapor and liquid flow rates and this range may extend from low vapor-high liquid rates to high vapor-low liquid rates.

Accordingly, one object of the invention is to provide improved means for controlling flow through the fluid flow orifice of a fluid contact tray and similar apparatus whereby greater efficiency is made possible over a wider range of operating conditions.

A primary object of the invention is to provide improved flow control means for the vapor or fluid flow orifice of a fluid contact tray having an element overlying said orifice for directing ascending fluid laterally through the liquid on the tray and so constructed that a vena contracta is created at the fluid-liquid interface which enlarges the area of said interface and increases the turbulence of the fluid and liquid and causes more intimate contact and thorough mixing of said fluid and liquid.

2

A particular object of the invention is to provide improved flow control means, of the character described, wherein the overlying element is spaced above the orifice to form a flow passage for accommodating a selected initial flow rate range and is movable upwardly to increase the area of the flow passage and permit a greater or desired maximum flow rate, the initial area of said flow passage being a predetermined percentage, preferably, between 25% and 50%, of the total area of said passage whereby greater operating efficiency is obtained at extremely low as well as high rates of vapor flow.

An important object of the invention is to provide improved flow control means for the vapor orifice of a fluid contact tray having a valve element overlying said orifice for directing vapor laterally through the liquid on the tray, the element being formed with a sharp edge at the underside of its perimeter to create a vena contracta at the vapor-liquid interface for increasing the area of said interface and turbulence of the fluid and liquid to more intimately contact and thoroughly mix the same.

Another object of the invention is to provide improved flow control means, of the character described, wherein the element has a downwardly and outwardly inclined surface at the underside of its perimeter for imparting centripetal force to the vapor so as to amplify the amount of the vena contracta at the vapor-liquid interface and thereby create a "fantail" effect which enlarges the area of said interface and causes extreme turbulence and prolonged contact and thorough mixing of said vapor and liquid.

A further object of the invention is to provide improved flow control means, of the character described, which affords more useable capacity and/or greater efficiency at high vapor rates and the efficiency remains high at extremely low vapor rates, said high efficiency over a wide range of vapor rates permitting the improvement of product quality and reduction of the reflux ratio which results in economy of operation and more effective utilization of auxiliary equipment, exchangers, pumps, instruments and associated facilities as well as minimum utility expanse.

An object of the invention is to provide improved flow control means, of the character described, having maximum efficiency at low vapor rates so as to insure a minimum quantity of off-specification products during start-up, which is adapted to virtually eliminate sticking of the element due to rusting or corrosion, to minimize pressure drop, to decrease shutdown time due to rapid draining, to simplify maintenance, to improve worker comfort due to absence of sharp projections above the tray, and to eliminate pulsation and instability.

A construction designed to carry out the invention will be hereinafter described, together with other features of the invention.

Figure 2:
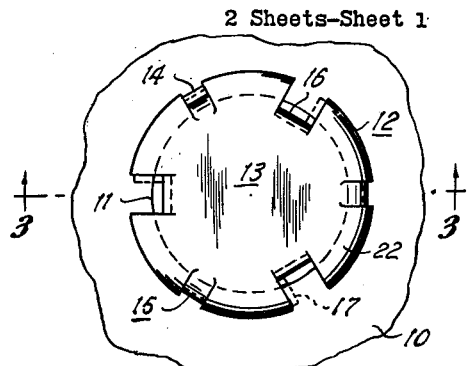
Figure 3:
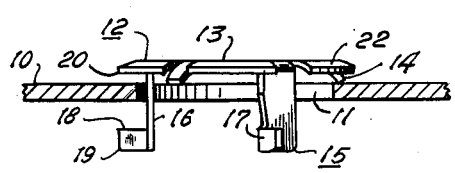
Figure 4:
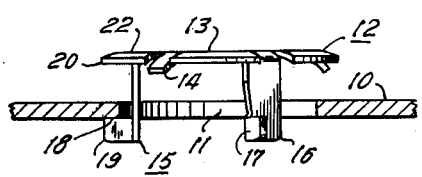
Figure 5:
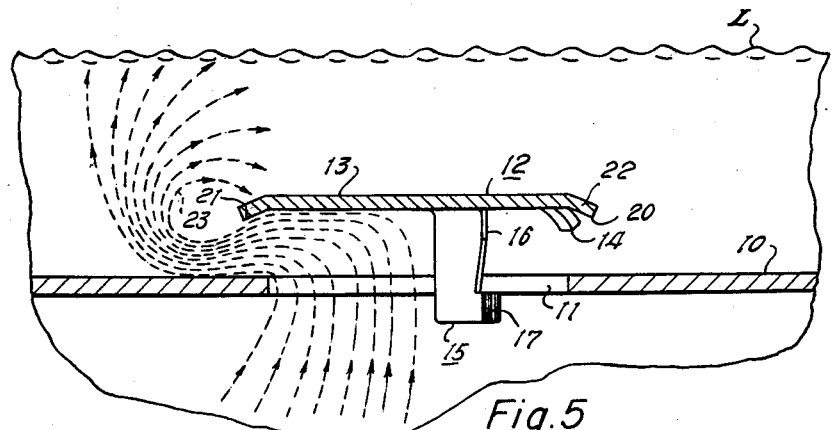
Figure 6:
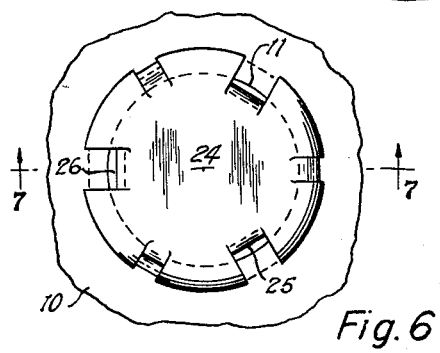
Figure 7:
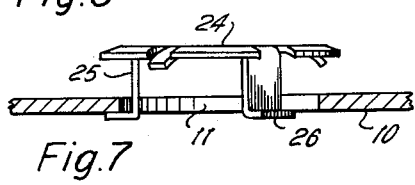
Figure 8:
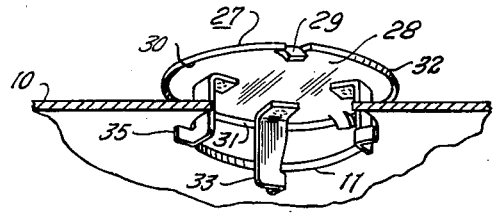
Figure 9:
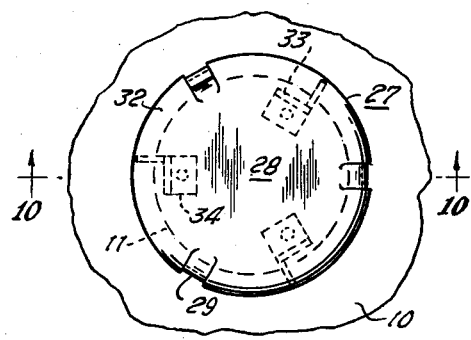
Figure 10:
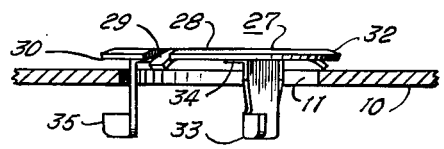
Figure 11:
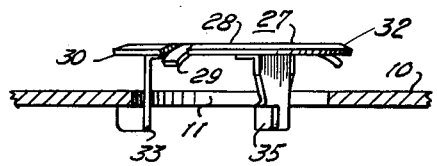
Figure 12:
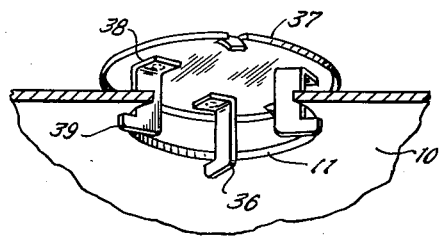
Figure 13:
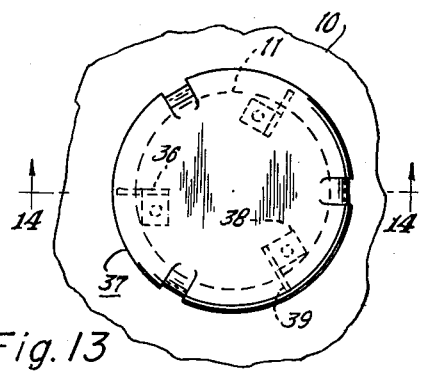
Figure 14:
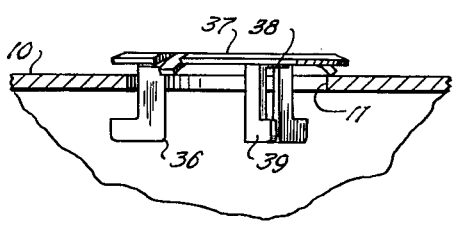
Figure 15:
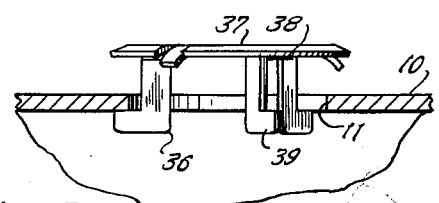

The invention will be more readily understood from a reading of the following specification and by reference to the accompanying drawings, wherein examples of the invention are shown, and wherein:

FIG. 1 is a perspective view of a valve element constructed in accordance with the invention and mounted in one of the vapor orifices of a fluid contact tray, shown in section, for controlling the flow of vapor through the orifice, the element being in its fully opened position, FIG. 2 is a plan view of the valve element and a portion of the tray, FIG. 3 is a transverse, vertical, sectional view, taken on the line 3—3 of FIG. 2, with said valve element in elevation and in its initial or partially opened position, FIG. 4 is a view, similar to FIG. 3, with said element in its fully opened position, FIG. 5 is an enlarged, transverse, vertical, sectional view showing the flow of the vapor through the orifice as controlled by said fully opened element, FIG. 6 is a view, similar to FIG. 2, of a modified valve element, FIG. 7 is a transverse, vertical, sectional view, taken on the line 7—7 of FIG. 6, with the modified element in elevation and in its fully opened position, FIGS. 8–11 are views, similar to FIGS. 1–4, of another modified valve element, and FIGS. 12–15 are views, similar to FIGS. 1–4, of a further modified valve element.

In the drawings, the numeral 10 designates one of the superimposed decks or trays which extend transversely across the interior of a tower or vessel (not shown) of the type used in petroleum and chemical processes, such as fractionation, absorption and distillation, wherein gas or vapor and liquids or liquids and liquids are contacted for separation, recovery, refinement, or purification. As shown by the letter L in FIG. 5, it is conventional to maintain a desired level of liquid on each tray for contact with ascending gas, vapor or other fluid. The tray 10 has a multiplicity of openings, ports or orifices 11, which usually are equally spaced and which may be arranged in rows, to accommodate the upward flow of vapor into contact with the liquid on said tray. Although shown as being circular, each orifice 11 may be of any desired contour and may vary in size. A cover or valve element 12 is provided for each orifice to control its flow area in accordance with differentials in pressures across, i.e., above and below, the tray and to insure intimate contact and thorough mixing of the ascending vapor with the liquid on said tray.

Each valve element 12 includes a relatively-thin, substantially flat disk or plate 13 which is complementary to its orifice 11 and has a slightly greater diameter or dimensions for overlying the margin of the tray surrounding the orifice so as to direct the vapor laterally through the liquid on the tray 10. A plurality of lugs or projections 14 are struck from the perimetrical portion of the plate 13 and are bent downwardly for engagement with the topside of the tray to space said plate above the orifice and provide a flow passage for the vapor ascending through the orifice (FIG. 3). In addition to determining the initial area of the flow passage, the depending projections 14 permit accurate adjustment of said initial area by being capable of being bent upwardly or downwardly and prevent sticking of the valve plate due to surface tension, rusting or corrosion. For limiting upward movement of the plate 13, a travel stop 15 is carried by said plate and is adapted to depend through the orifice, being shown in the form of a plurality of upright legs or members 16 which are of much greater width than thickness. Each leg 16 has an enlarged lower end portion projecting laterally beyond the margin of the orifice, preferably, being in the form of an outwardly bent ear or lug 17 on one of the longitudinal margins of the leg, in underlying, spaced relation to the underside of the tray. Although the length of the legs is subject to variation, said length and the location of the lugs 17 control the vertical movement or travel of the valve element 12 and the elevation of its plate 13 in the open position of said element. A flat, horizontal surface 18 is provided on the upper margin of each lug for engagement with the underside of the tray (FIGS. 1, 4 and 5). In order to facilitate insertion of the travel stop 15 through the orifice 11, each lug 17 may have a bevelled or chamferred lower corner portion 19. Initially, the legs 16 are formed as coplanar extensions of the valve plate and have their inner portions terminating inwardly of the perimeter of said plate. The longitudinal margins of the legs are separated from the plate and provide openings in the perimeter of said plate upon downward bending of said legs at substantially a right angle to form the travel stop 15 for the valve element 12. One or more of the travel stop legs are adapted to be bent to permit insertion and removal of the travel stop through the orifice.

As shown most clearly in FIG. 5, the valve plate 13 has a sharp edge 20 at the underside of its perimeter to provide a vena contracta at the vapor-liquid interface for increasing the area of the interface and turbulence of the vapor and liquid to more intimately contact and thoroughly mix the same. The sharp edge 20 is formed by the stamping of the plate from a flat sheet whereby the underside of said plate has its entire area in a common plane. Since the contour of the topside of the plate is immaterial, it may be parallel to the underside of said plate so as to provide a perpendicular perimeter, as shown, or may be inclined relative to said underside. It is noted that the periphery of the valve plate overhangs or extends laterally beyond the margin of the orifice 11 whereby all of the vapor ascending through said orifice is deflected by said plate and is directed laterally outward at substantially a right angle. In order to insure this 90° change of direction of the vapor stream, the overhang or lateral projection of the perimeter of the plate with respect to the margin of the orifice is a minimum of one-fourth of the distance of the valve element 12 from the tray in its fully opened position. Depending on the parasitic pressure drop that may be tolerated, the amount of the overhang may be as much as 1¼ times the total elevation of the valve element. The optimum amount of overhang or lateral projection of the perimeter of the valve plate with respect to the orifice is one-half of the maximum distance of the valve element from the tray. The maximum discharge area of the flow passage between the tray and the plate 13 in its upper position is equivalent to the area of the orifice within plus or minus 15% in accordance with pressure drop requirements.

Turbulent action, which results in a greater degree of mixing of the vapor with the liquid, is obtained by utilizing the sharp edge orifice effect provided by the sharp edge 20 at the underside of the perimeter of the valve plate 13. For amplifying the vena contracta at the vapor-liquid interface, the underside of the perimeter of the valve plate is provided with a downwardly and outwardly inclined surface 21 which constricts the area of the flow passage formed by the coaction of said plate with the margin of the tray surrounding the orifice (FIG. 5). Although the inclined surface 21 may be formed in any suitable manner, it is most economical to provide the same by bending the perimeter of the plate downwardly whereby said plate has a perimetrical lip 22. It is noted, however, that the upper surface of the lip 22 may be coplanar with or extend at any angle relative to the topside of the valve plate. The inclined surface imparts centripetal force to the vapor and creates a "fantail" effect, as shown by the broken lines 23 in FIG. 5, which further increases the area of the vapor-liquid interface and causes extreme turbulence and prolonged contact and thorough mixing of the vapor and liquid. As a result, greater operating efficiency is obtained at extremely low as well as high rates of vapor flow and in both the partially opened and fully opened positions of the valve element. In addition to constricting the area of the flow passage, the inclined surface directs the vapor downwardly toward the tray so as to elongate its lateral movement through the liquid on said tray.

It has been found that the angle of the inclined surface 21 may vary between 15° and 45° and that between 18° and 20° is the optimum angle without incurring excessive pressure drop or reduction in the quantity of vapor discharged when it is necessary to maintain a given pressure drop value. In certain types of operation, an angle of up to 45° may be desirable in order to insure added cleaning action of the vapor stream in "dirty" service. Since the vapor is actually flowing into the liquid on the tray for the purpose of intimate vapor-liquid contact, the extent of the bubbling action is quite important in order to insure thorough mixing of the vapor with the liquid. Because the liquid is flowing across the tray, the residence time of said liquid above the orifice 11 and its valve element 12 is relatively short. Therefore, extreme vapor turbulence is essential to thorough and efficient contact of the vapor and liquid. It is pointed out that the amplified vena contracta provided by the sharp edge 20 and inclined surface 21 eliminates the possibility of liquid bypassing the tray and dripping or flowing downwardly through the orifice. Also, fouling of the orifice margin is prevented by the cleaning resulting from the increase of velocity in the vena contracta of the vapor stream.

Preferably, the initial area of the flow passage, provided by the spacing of the valve element 12 above the orifice 11 by the engagement of the depending projections 14 with the topside of the tray 10, is a predetermined percentage of the maximum area of said passage resulting from the lifting of said element to its fully opened position in which the lugs 17 of the travel stop legs 16 engage the underside of said tray (FIGS. 1, 4 and 5). This percentage of initial flow area is important because it controls the range of operation and makes possible a greater operating efficiency over a wide range of vapor-liquid loads. It has been found that the efficiency is greatest when the initial area of the flow passage is between 25% and 50% of the maximum area of said passage, with the optimum being 30%.

By experimentation, it has been found that the operation is not stable when the initial area is less than 25% of the maximum area. The valve elements underwent erratic opening and shutting movement due to the inertia of the weight of said elements relative to the pressure or force of the ascending vapor endeavoring to open said elements to their fullest extent. This unstable condition encouraged intermittent leakage through the orifices because of the sudden discharge of vapor through said orifices when the elements opened and shut or partially closed. Also, such initial area of the flow passages resulted in poor vapor distribution when the force of the vapor required to overcome the inertia of the valve elements reached a magnitude that indiscriminately opened certain elements on the tray without regard to their location or distribution. In addition to the initial and preliminary unstable and erratic action of the valve elements, the indiscriminate opening of certain of the elements caused some parts of the tray to be active while other parts were stagnant or dead, and the liquid channeled across said tray without benefit of contact with the vapor. In other words, as soon as sufficient vapor pressure was built up to open some of the valve elements, irrespective of their location on the tray, the liquid head over said elements was reduced by aeration and considerable additional vapor had to be supplied in order to induce other elements on the tray to open.

It is also found that the initial area of the flow passage should not be more than 50% of its maximum area, because the flexibility or range of operation was adversely affected above this percentage. A larger initial area encouraged excessive weeping and leakage at low rates of flow of vapor and liquid, or both, with a consequent loss in efficiency. By maintaining the initial area between 25% and 50% of the maximum area of the flow passage, a fractionating tray can have high efficiency and capacity at any desired pressure drop across said tray so as to permit the use of a minimum number of trays in a tower of minimum size.

Due to its construction, the valve element 12 offers substantially no obstruction to the flow of liquid across the tray so as to minimize liquid gradient. Since the lugs 17 of the travel stop legs 16 are relatively thin and extend substantially radially of the orifice 11, there is minimum interference with the flow of vapor through said orifice. In addition to functioning as guides for the valve element, the positioning of the legs adjacent the margin of the orifice offers less obstruction to vapor flow and a resulting lower pressure drop across the tray. Also, sufficient clearance between the legs and the orifice margin can be provided for freedom of movement of the element without danger of said element escaping from confinement when in operation. The element is of rugged construction, easy to manufacture, and adapted to be pressed and formed from many different types of material without uneconomical waste thereof. The element is adaptable to any desired tray thickness and does not have any sharp projections above the tray which would be uncomfortable to workers during installation and maintenance.

A modified valve element 24 is shown in FIGS. 6 and 7 and is identical in construction to the element 12 except for its travel stop legs 25. Instead of the lugs 17, each leg 25 has its lower end portion bent outwardly upon itself to provide a foot or lug 26 for engagement with the underside of the tray 10. Manifestly, the feet 26 are not as desirable as the lugs 17 because of their greater surficial contact with the tray and obstruction to the flow of vapor through the orifice 11, which flow obstruction may be sufficient to cause liquid to drip or drain by capillary or wick action to the tray below, It is noted, however, that the lugs 26 are less difficult and expensive to form.

Another modified valve element 27 is shown in FIGS. 8–11 and includes a disk or plate 28 similar to the plate 13 and having similar depending lugs or projections 29, sharp edge 30 at the underside of its perimeter, inclined surface 31 and lip 32. Instead of being made integral with the valve plate 28, the travel stop for the valve element 27 is provided by a plurality of separate members or legs 33 which are welded or otherwise secured to the underside of said plate. For attachment to the plate, the upper end of leg 33 is bent inwardly upon itself as shown by the numeral 34. A lug 35, similar to the lug 17, is formed on the lower end of each leg for engagement with the underside of the tray 10 to limit upward movement of the valve element 27.

In order to offer minimum resistance to the passage of vapor from the orifice 11 to the perimeter of the valve element, the travel stop legs may extend radially of said orifice as shown by the numeral 36 in FIGS. 12–15. Since the valve element 37 is otherwise identical to the element 27, it will not be described in detail. The upper end 38 of each leg is bent upon itself for underlying engagement and connection with the valve plate of the element 37. In place of the outwardly bent lug 35, each leg 36 has a coplanar lateral projection or lug 39 projecting laterally from its lower end for engagement with the underside of the tray 10. As shown most clearly in FIG. 13, the legs 36 and lugs 39 are oriented so as to extend radially of the orifice 11 so as to present their least dimensions or narrowest surfaces to the margin of said orifice. When so oriented, it is manifest that the travel stop legs offer minimum resistance to the flow of vapor from the orifice to the perimeter of the valve element.

From the foregoing, it is believed to be readily apparent that the improved flow control means or valve elements of this invention afford more useful capacity and/or greater efficiency at high vapor rates and that the efficiency remains high at extremely low vapor rates. Due to high efficiency over a wide range of vapor rates, the improvement of product quality is permitted and the reflux ratio is reduced thereby resulting in economy of operation and more effective utilization of auxiliary equipment, exchangers, pumps, instruments and associated facilities as well as minimum utility expense. The flow control means has maximum efficiency at low vapor rates so as to insure a minimum quantity of off-specification products during start-up and is adapted to virtually eliminate sticking of the valve elements due to rusting or corrosion, to minimize pressure drop, to decrease shutdown time due to rapid draining, to simplify maintenance, and to eliminate pulsation and instability.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. For use in a fluid-liquid contact apparatus which includes a tray having an opening and wherein the margin of the upper surface of the tray surrounding the opening is flat, control means comprising an element overlying the opening for directing fluid ascending through the opening laterally through liquid on the tray, means spacing said element from the opening, and means mounting said element for movement by the pressure of the fluid ascending through the opening, said element having a downwardly and outwardly inclined undersurface of narrow width adjacent said margin and terminating in a sharp edge orifice at the underside of its perimeter and substantially continuous therewith for constricting the area of the flow passage formed by the coaction of the opening and element, the underside of said element adjacent said inclined surface being parallel to the plane of the tray surrounding the opening to provide a flow passage therebetween of uniform area, said sharp edge orifice providing a vena contracta and said inclined undersurface imparting centripetal force to the fluid to amplify the vena contracta at the fluid-liquid interface for creating a fantail effect which increases the area of said interface and causes extreme turbulence and prolonged contact and thorough mixing of the fluid and liquid.

2. Control means as set forth in claim 1 wherein said element is of substantially uniform thickness and wherein the inclined perimetrical surface of said element is formed by a depending narrow substantially continuous thin lip.

3. Control means as set forth in claim 1 wherein said element is a substantially flat relatively thin plate having a lip which forms said sharp edge orifice.

4. Control means as set forth in claim 3 including means for limiting the movement of said element comprising members integral with and depending from the perimetrical portion of the plate and extending through the opening of the tray and having lower end portions projecting laterally beyond the margin of the opening for engagement with the underside of the tray upon lifting of said element, said integral members being disposed inwardly of the perimeter of the plate and providing openings in said perimetrical portion to accommodate flow of the ascending fluid prior to lifting of said element.

References Cited in the file of this patent

UNITED STATES PATENTS

| | | |
|---|---|---|
| 1,057,576 | Mussell | Apr. 1, 1913 |
| 1,453,735 | Twining | May 1, 1923 |
| 2,061,830 | Campbell | Nov. 24, 1936 |
| 2,772,080 | Huggins et al. | Nov. 27, 1956 |
| 2,979,316 | Houston | Apr. 11, 1961 |
| 2,982,527 | Eld et al. | May 2, 1961 |
| 3,025,041 | Sandler | Mar. 13, 1962 |

FOREIGN PATENTS

| | | |
|---|---|---|
| 595,404 | Germany | Apr. 10, 1934 |
| 755,019 | France | Sept. 4, 1933 |